United States Patent
Chan

(10) Patent No.: US 9,822,512 B2
(45) Date of Patent: Nov. 21, 2017

(54) HOSE NUT, WATER HOSE ASSEMBLY COMPRISING THE HOSE NUT AND SHOWER SYSTEM COMPRISING THE WATER HOSE ASSEMBLY

(71) Applicant: Chesta Chan, North Point (HK)

(72) Inventor: Chesta Chan, North Point (HK)

( * ) Notice: Subject to any disclaimer, the term of this patent is extended or adjusted under 35 U.S.C. 154(b) by 0 days.

(21) Appl. No.: 14/657,290

(22) Filed: Mar. 13, 2015

(65) Prior Publication Data
US 2015/0345116 A1 Dec. 3, 2015

Related U.S. Application Data

(60) Provisional application No. 62/003,629, filed on May 28, 2014.

(30) Foreign Application Priority Data

Mar. 9, 2015 (DE) .................... 20 2015 101 159 U

(51) Int. Cl.
*E03C 1/02* (2006.01)
*B05B 1/18* (2006.01)
(Continued)

(52) U.S. Cl.
CPC .............. *E03C 1/021* (2013.01); *B05B 1/185* (2013.01); *B05B 15/066* (2013.01); *E03C 1/06* (2013.01); *E03C 1/066* (2013.01); *F16L 15/04* (2013.01); *F16L 15/08* (2013.01); *F16L 33/28* (2013.01); *B05B 1/18* (2013.01); *B05B 15/061* (2013.01);
(Continued)

(58) Field of Classification Search
CPC .......... E03C 1/021; E03C 1/025; E03C 1/066; B05B 1/185; B05B 15/061; B05B 15/065; B05B 15/08
See application file for complete search history.

(56) References Cited

U.S. PATENT DOCUMENTS 2,776,168 A * 1/1957 Schweda .................. E03C 1/06
239/587.1
3,826,454 A * 7/1974 Zieger ...................... E03C 1/06
248/274.1
(Continued)

FOREIGN PATENT DOCUMENTS

CN 2520207 Y 11/2002
CN 2906268 Y 5/2007
(Continued)

OTHER PUBLICATIONS

Machine Translation for DE 9300418.*
(Continued)

*Primary Examiner* — Erin Deery
(74) *Attorney, Agent, or Firm* — Koppel, Patrick, Heybl & Philpott

(57) ABSTRACT

The present invention provides a hose nut for connecting a shower head to a water hose which can be easily and slidably attached on a wall by utilizing magnetic attraction forces. The present invention also provides a water hose assembly comprising a water hose and the hose nut connect to the water hose. Furthermore, the present invention provides a shower system comprising the water hose assembly, a shower head and a holding device mounted on a wall for attachment of the hose nut.

26 Claims, 19 Drawing Sheets

(51) Int. Cl.

| | |
|---|---|
| *F16L 15/04* | (2006.01) |
| *F16L 15/08* | (2006.01) |
| *F16L 33/28* | (2006.01) |
| *E03C 1/06* | (2006.01) |
| B05B 15/06 | (2006.01) |
| F16L 27/08 | (2006.01) |
| B05B 15/08 | (2006.01) |

(52) U.S. Cl.
CPC ............... *B05B 15/08* (2013.01); *E03C 1/025* (2013.01); *F16L 27/0849* (2013.01); *Y10T 137/9029* (2015.04)

(56) References Cited

U.S. PATENT DOCUMENTS

| | | | | |
|---|---|---|---|---|
| 4,561,136 A | * | 12/1985 | Baer | E03C 1/06 4/615 |
| 4,914,759 A | * | 4/1990 | Goff | E03C 1/06 239/283 |
| 6,450,425 B1 | * | 9/2002 | Chen | E03C 1/06 239/587.4 |
| 8,109,450 B2 | * | 2/2012 | Luettgen | B05B 1/1636 239/443 |
| 8,146,838 B2 | * | 4/2012 | Luettgen | B05B 1/1636 239/443 |
| 8,205,846 B2 | * | 6/2012 | Glunk | E03C 1/06 248/206.5 |
| 8,746,596 B2 | * | 6/2014 | Grether | E03C 1/021 239/525 |
| 2003/0041372 A1 | * | 3/2003 | Yang | A47K 3/28 4/605 |
| 2012/0266376 A1 | * | 10/2012 | Marty | B05B 1/185 4/615 |

FOREIGN PATENT DOCUMENTS

| | | | | |
|---|---|---|---|---|
| CN | 201255277 | | 6/2009 | |
| CN | 201696771 | | 1/2011 | |
| CN | 102873000 | | 1/2013 | |
| DE | 2711584 A1 | * | 9/1978 | |
| DE | 9300418 U1 | | 3/1993 | |
| DE | 10030644 A1 | | 1/2002 | |
| DE | 102006056511 | | 6/2008 | |
| DE | 202012103207 U1 | * | 8/2013 | ............. E03C 1/066 |
| EP | 0423644 A1 | | 4/1991 | |
| EP | 2444706 A1 | | 4/2012 | |
| KR | 20120035521 | | 4/2012 | |
| WO | WO 2009016491 | | 2/2009 | |

OTHER PUBLICATIONS

Machine Translation for DE2711584.*
International Search Report and Written Opinion from Appl No. PCT/CN2015/079287, dated Aug. 17, 2015.
Extended European Search Report from Patent appl. No. 15275065.9. dated Oct. 23, 2015.

* cited by examiner

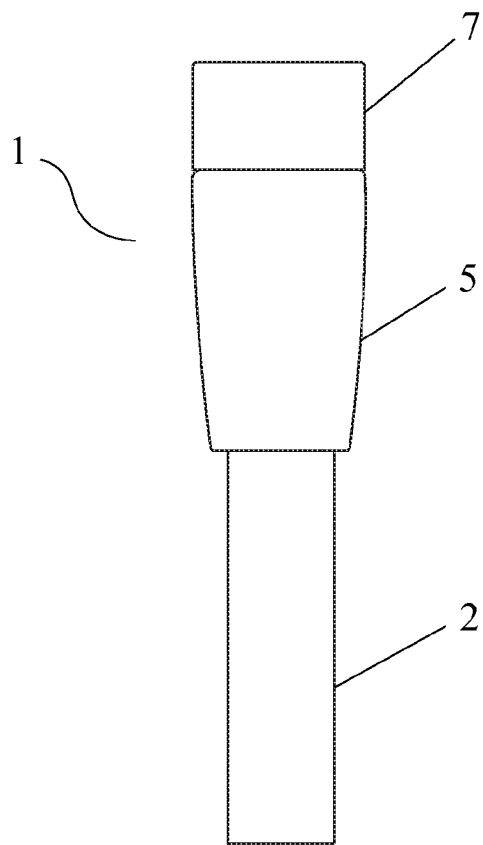
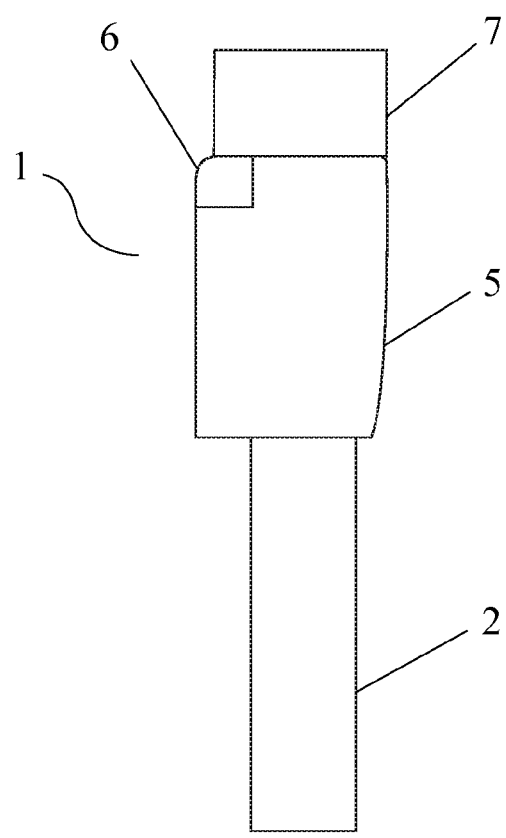
Fig. 2A                Fig. 2B
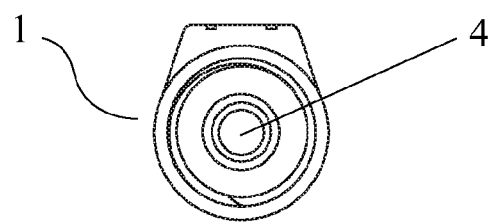
Fig. 2C

HOSE NUT, WATER HOSE ASSEMBLY COMPRISING THE HOSE NUT AND SHOWER SYSTEM COMPRISING THE WATER HOSE ASSEMBLY

RELATED APPLICATION

This non-provisional application claims priority from provisional application No. 62/003,629 filed on May 28, 2014, and German utility patent application no. 202015101159.8 filed Mar. 9, 2015, the disclosures of which are incorporated herein by reference in their entirety.

TECHNICAL FIELD OF THE INVENTION

This invention relates generally to fittings used for a shower network system and, more particularly, to a hose nut for connecting a shower head to a water hose, to a water hose assembly comprising the hose nut and to a shower system comprising the water hose assembly. The fittings of the invention allow to eliminate the need of drilling holes on the wall and of utilizing screws/bolts to mount the shower system.

BACKGROUND OF THE INVENTION

Current shower systems typically comprise a water hose, one end of which is connected to a faucet and the other end of which is connected to a shower head. The shower head is usually held by a shower head holder mounted on the wall by fasteners such as screws/bolts for firmly securing the shower head onto the wall.

A common feature of this type of wall-mounted shower head is that the mounting of the shower head requires one or more holes to be drilled on the wall or even surface. By doing this, the wall surface would definitely be damaged and affected. Another disadvantage of this shower head is that it tends to be labor intensive to screw the shower head holder on the wall in place by screwing the screws and bolts or remove the holder from the wall. This is not a satisfactory task.

Therefore, the invention entails the task of creating a simple and cost-effective a shower system comprising a hose nut for a shower head that is able to be surely and stably attached onto a wall or even surface. The hose nut according to the invention eliminates the use of any kind of fasteners, such as screws/bolts and the need of drilling holes on the wall, with a consequence of maintaining the surface of the wall or even surface not to be damaged or affected. The shower system also allows easy adjustment of the height of the shower head, preferably by one hand, which is simple in structure.

SUMMARY OF THE INVENTION

The present invention has been developed to fulfill the needs noted above and therefore has a principle object of providing a hose nut for connecting a shower head to a water hose, which hose nut can be easily attached to the wall without any damage to the wall and the position of which can be conveniently adjusted. The present invention also aims to provide a water hose assembly comprising such a hose nut. Furthermore, the present invention aims to provide a shower system comprising said water hose assembly.

These and other objects are satisfied by the present invention, which provides a hose nut for connecting a shower head to a water hose, comprising a nut body having a throughbore formed therein, the body comprising: a lower portion for receiving at least a part of the water hose; a transition portion immovably secured to the lower portion; an upper portion for connection to the shower head and arranged on the transition portion in such a manner that the upper portion is rotatable relative to the transition portion around an axis of the upper portion; and at least one magnetic element mounted on a side of the lower portion, the magnetic element being selected such that it is slidably attached to a holding device on a wall for hanging the shower head on the wall by a magnetic attraction force generated between the magnetic element and the holding device.

In a preferred embodiment of the present invention, the hose nut may further comprise a mandrel assembly comprising a top flange having a central throughbore, and a mandrel extending downwardly from the top flange and having a central axially aligned through bore with the throughbore of the top flange to define a flow bore for water to pass through the mandrel assembly, wherein the mandrel assembly may be disposed within the throughbore of the nut body, with the flow bore of the mandrel assembly in communication with the throughbore of the nut body.

The upper portion of the nut body may comprise a shoulder extending inwardly from an inner surface of the throughbore of the upper portion, the shoulder defining an opening that is configured for allowing passage of the mandrel to be fixed to the transition portion of the nut body but preventing the top flange from passing therethrough, such that the upper portion is rotatable about the mandrel assembly relative to the transition portion.

The transition portion may have internal threads formed on the inner surface of the throughbore thereof for mating engagement with corresponding threads formed on an outside of the mandrel of the mandrel assembly.

A first O-ring seal may be placed between a bottom surface of the top flange of the mandrel assembly and the shoulder of the upper portion of the nut body.

A second O-ring seal may be placed between a top surface of the top flange of the mandrel assembly and the shower head.

The at least one magnetic element may be recessed in an undercut portion formed on the side of the lower portion of the nut body and held by a holder which is configured to define together with a surface of the undercut portion a space in which the at least one magnetic element is enclosed.

The holder for holding the at least one magnetic element may be provided to be flush with an outer surface of the lower portion of the nut body.

In a preferred embodiment of the present invention, the transition portion may be accommodated within the lower portion.

In a preferred embodiment of the present invention, a cover portion may extend upwardly from a top of the lower portion to form a one-piece housing of the hose nut, and the upper portion is accommodated within the cover portion.

In a preferred embodiment of the present invention, the transition portion and the upper portion of the nut body are provided such that the transition portion is secured at an angle to the lower portion but is aligned with the upper portion.

In another preferred embodiment of the present invention, the lower portion, the transition portion and the upper portion of the nut body are aligned.

The upper portion may have internal threads formed on the inner surface of the throughbore thereof for mating engagement with corresponding threads formed on an outside of the shower head. Alternatively, the upper portion may be connected to the shower head by snap fit.

In a preferred embodiment of the present invention, the hose nut may further comprise a hose adapter connected to the lower portion of the nut body, enabling connection of the hose nut to different water hoses.

In a preferred embodiment of the present invention, the at least one magnetic element may be a flat magnet.

A third O-ring seal may be provided between the hose nut and the water hose.

In a preferred embodiment of the present invention, the hose nut may further comprise a buffering pad mounted on an outer side surface of the holder, which surface is to be attached to the holding device on the wall for hanging the shower head; and the buffering pad is capable of increasing a friction between the outer side surface of the the magnetic element holder and the holding device to reinforce the attachment therebetween. Preferably, the buffering pad is made of rubber.

In a preferred embodiment of the present invention, the hose nut may further comprise a locking mechanism for locking the upper portion with the shower head at a desirable angle and preventing the rotation of the upper portion relative to the transition portion around the axis of the upper portion. The locking mechanism may comprise a button, and a stopper coupled to the button, the stopper being configured to engage with the upper portion thereby creating a lock therebetween for prevention of the rotation of the upper portion when the button is released, and to disengage from the upper portion to allow the rotation of the upper portion when the button is pressed.

The stopper may have at least one tooth on an inner wall surface thereof, wherein the at least one tooth is able to engage with one of a plurality of recesses circumferentially formed on an outer surface of a bottom of the upper portion when the button is released, and the at least one tooth of the stopper is forced to disengage from the recess on the bottom of the upper portion when the button is pressed.

A pair of posts may extend upwardly from a top of the holder and the stopper may be pivotally mounted between the pair of posts in such a manner that, when the button is pressed, the stopper is pushed by the button to pivot downwardly causing the at least one tooth of the stopper to disengage from the recess on the bottom of the upper portion.

The stopper may comprise an arc-shaped portion arranged under the upper portion, and the at least one tooth may be formed on an inner surface of the arc-shaped portion.

The locking mechanism may further comprise a spring compressed under the stopper to constantly apply an upward force to the stopper, such that when the button is released, the stopper is forced by the spring to pivot upwardly, causing the at least one tooth of the stopper to engage with the recess on the bottom of the upper portion.

In a preferred embodiment of the present invention, the magnetic element holder is made of a high density plastic material to maintain the magnetic attraction force between the magnetic element and the holding device.

A second aspect of the present invention provides a water hose assembly for connecting a faucet and a shower head, comprising a water hose, and a hose nut of the present invention in connection with one end of the water hose.

In a preferred embodiment of the present invention, the water hose and the hose nut may be prefabricated as one piece.

A third aspect of the present invention provides a shower system comprising: a water hose assembly of the present invention, a shower head, and a holding device mounted on a wall for hanging the shower head on the wall by a magnetic attraction force generated between the magnetic element and the holding device.

In a preferred embodiment of the present invention, the holding device may be provided as a metallic or magnetic bar, or as a metallic or magnetic panel, such that the hose nut is able to be slidably attached to the bar or the panel at different heights or on different positions.

The bar or the panel may be mounted on the wall with an adhesive, and may have a longitudinal slot into which the at least one magnetic element of the hose nut is inserted, thereby the hose nut is guided to slide in the slot.

In contrast to the shower systems available in the prior art, the shower system of the invention utilizes the magnetic attraction force generated between the hose but and the magnetic bar or panel and eliminates the need of drilling holes on the wall and employing the screws and bolts, and thus leaving the wall to be unaffected. Further, adjustment of the position of the shower head is exceedingly simple owing to the fact that it is slidably hanged up on the wall conveniently and easily. Therefore, the shower system according to the invention is relatively simple in configuration, low in cost and fast to mount.

Apart from the above, the invention may have the following advantages:
 the hose nut is able to turn the shower head to adapt to different inclinations of the handle of the shower head;
 the hose nut is configured to be fitted into the metallic bar or panel according to the desired angle of the shower head; and
 the hose nut and thus the shower head may be slidable continuously along the bar or panel.

BRIEF DESCRIPTION OF THE DRAWINGS

FIGS. 2A-2C are front, side, and top views, respectively, of the hose nut shown in FIG. 1.

DETAILED DESCRIPTION OF THE INVENTION

While this invention is illustrated and described in preferred embodiments, the hose nut of the present invention may be produced in many different configurations, sizes, forms and materials.

Figure 1:
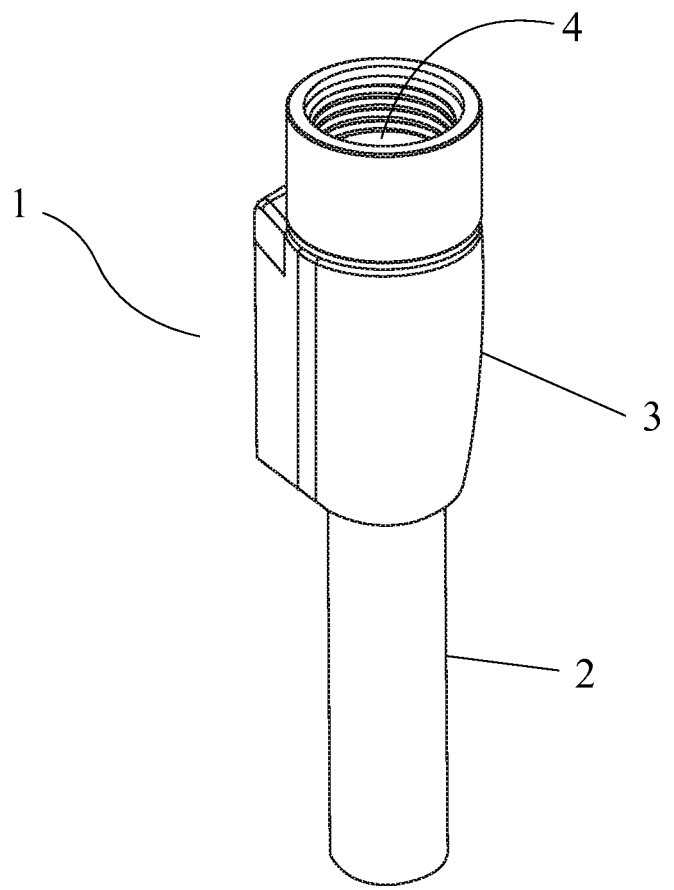
FIG. 1 is a perspective view of a hose nut according to an embodiment of the present invention connected to a water hose.
Figure 3:
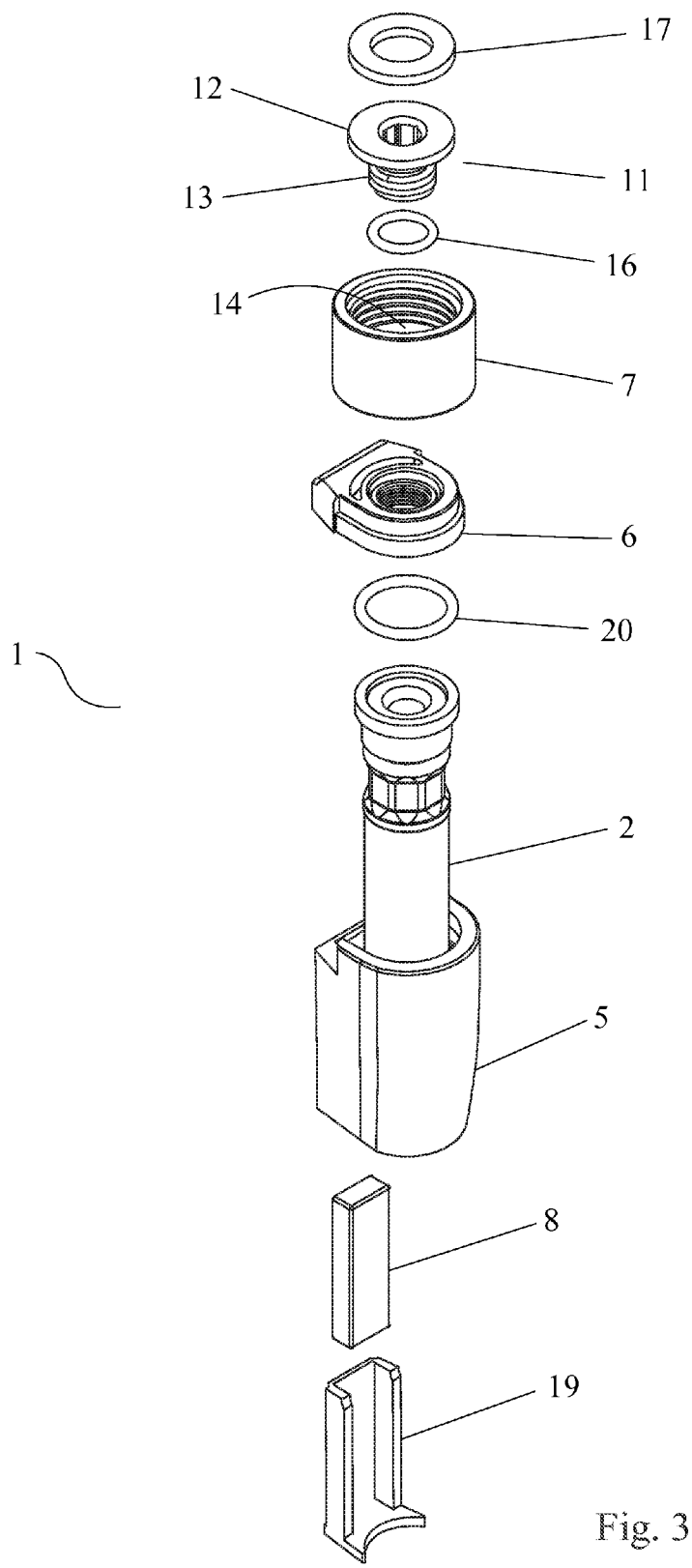
FIG. 3 is an exploded perspective view of the hose nut shown in FIG. 1.
Figure 4:
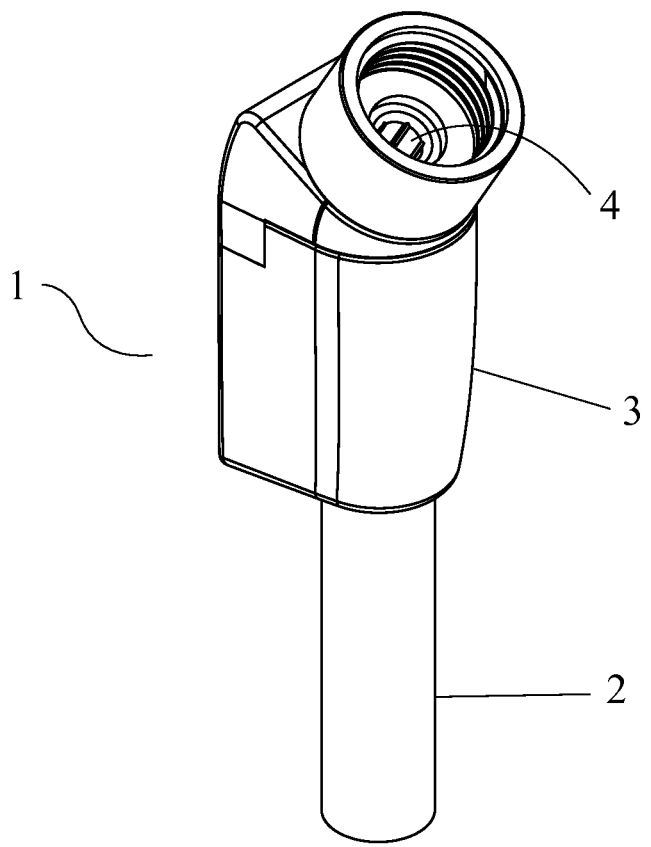
FIG. 4 is a perspective view of a hose nut according to an embodiment of the present invention connected to a water hose.
Figures 5A, 5B:
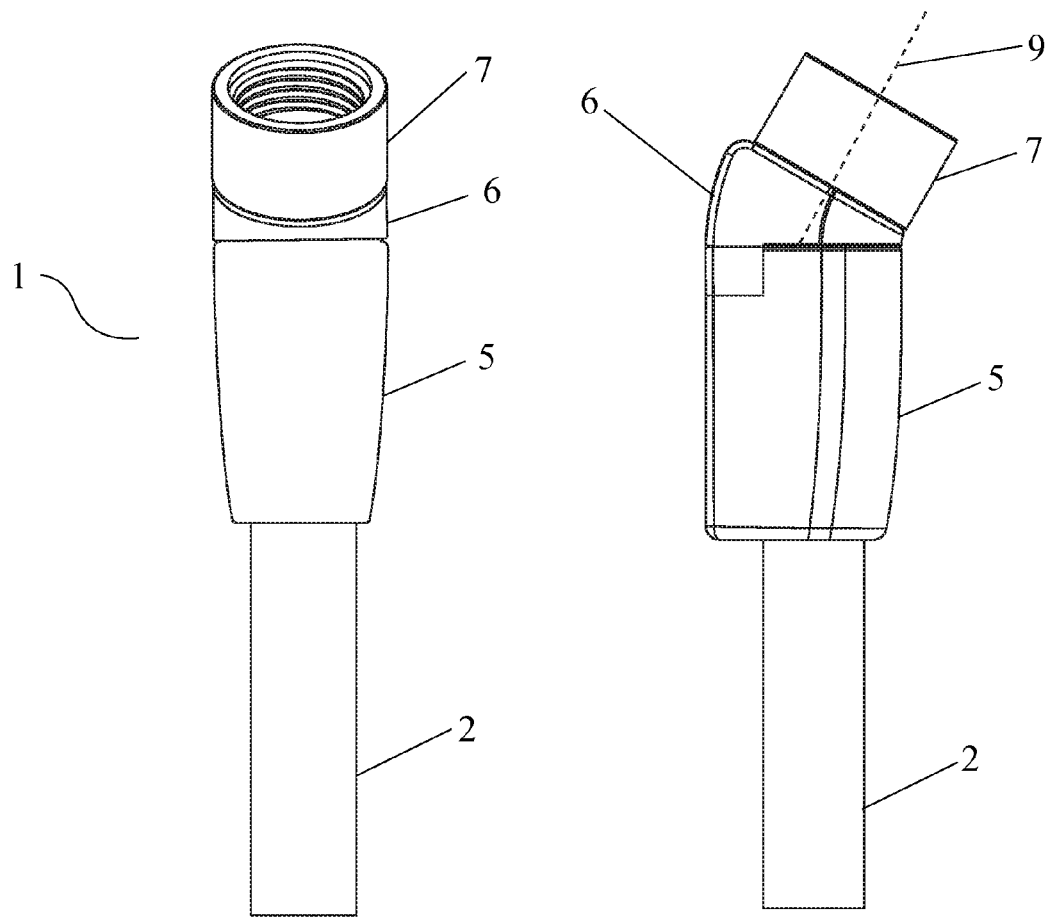
FIGS. 5A-5C are front, side, and top views, respectively, of the hose nut shown in FIG. 4.
Figure 5C:
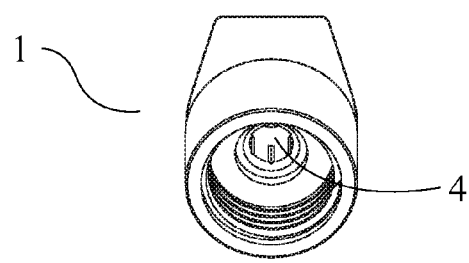

Referring now to the drawings, FIGS. 1-3 illustrate a hose nut 1 according to a first embodiment of the present invention. As shown in FIG. 3, the hose nut 1 comprises a nut body 3 having a throughbore 4 formed therein. The nut body 4 comprises a lower portion 5, a transition portion 6, an upper portion 7 and a magnetic element 8, preferably a flat magnet, mounted on a side of the lower portion 5. At least a part, for example an end portion, of the water hose 2, is received in the lower portion. The transition portion 6 is immovably secured to the lower portion 5, and the end portion of the water hose 2 is immovably secured to the transition portion 6, both by any one of the common manners in the art, such as threads and snap fit. The upper portion 7 for connection to a shower head (not shown) is arranged on the transition portion 6 in such a manner that the upper portion 7 is rotatable relative to the transition portion 6 around an axis 9 of the upper portion 7. The manner in which the upper portion 7 is rotatably connected to the transition portion 6 will be described in detail hereinbelow. In order to connect the upper portion 7 to the shower head, the upper portion 7 has internal threads formed on the inner surface of the throughbore thereof for mating engagement with corresponding threads formed on an outside of the shower head. In order to hang the shower head on a wall, a holding device 10 (see FIG. 19), such as a metallic or magnetic bar or panel, is mounted on the wall, and the hose nut 1 of the present invention is slidably attached to the holding device 10 by a magnetic attraction force generated between the magnetic element 8 and the holding device 10. The holding device may be made of any material suitable to generate the magnetic attraction with respect to the magnetic element 8.

As shown in FIG. 3, in order to rotatably connect the upper portion 7 to the transition portion 6, the hose nut 1 further comprises a mandrel assembly 11 comprising a top flange 12 and a mandrel 13 extending downwardly from the top flange 12. The top flange 12 has a central throughbore formed therein, and the mandrel 13 has a central throughbore axially aligned with the throughbore of the top flange 12. The central throughbores of the top flange and the mandrel define a flow bore for water to pass through the mandrel assembly. The mandrel assembly 11 is disposed within the throughbore 4 of the nut body 3, with the flow bore of the mandrel assembly in communication with the throughbore of the nut body 3. The upper portion 7 of the nut body 3 comprises a shoulder 14 extending inwardly from an inner surface of the throughbore of the upper portion 7. The shoulder 14 defines an opening 15 that is configured for allowing passage of the mandrel 13 to be fixed to the transition portion 6 of the nut body 3 but preventing the top flange 12 from passing therethrough, such that the upper portion 7 is rotatable about the mandrel assembly 11 relative to the transition portion 6. In this embodiment, the opening 15 has a diameter that is larger than a diameter of the mandrel 13 but smaller than an outer diameter of the top flange 12, such that the mandrel 13 is allowed to pass through the opening 15 while the top flange 12 is not. The mandrel assembly 11 is fixed to the transition portion 6 by mating engagement between internal threads formed on the inner surface of the throughbore of the transition portion 6 and corresponding threads formed on an outside of the mandrel 13. To prevent leaking of water, a first O-ring seal 16 is placed between a bottom surface of the top flange 12 of the mandrel assembly 11 and the shoulder 14 of the upper portion 7 of the nut body 3. In other words, the first O-ring seal 16 is placed around the mandrel 13 of the mandrel assembly 11. For the same purpose, a second O-ring seal 17 is place between a top surface of the top flange 12 of the mandrel assembly 11 and the shower head, and a third O-ring seal 20 is provided between the end of the water hose 2 and the transition portion 6 of the nut body 3.

Figure 7A:
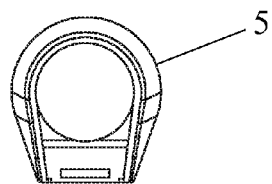
FIGS. 7A-7C are top, front and bottom views, respectively, of the lower portion of the hose nut shown in FIG. 4.
Figure 7B:
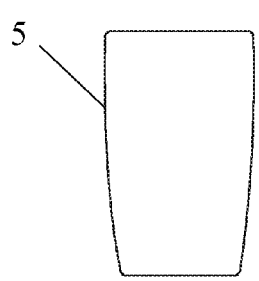
Figure 7C:
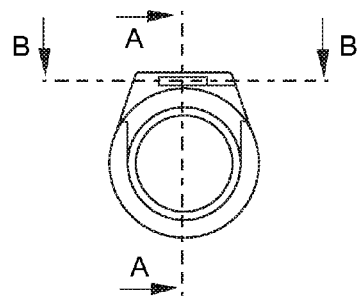
Figure 7D:
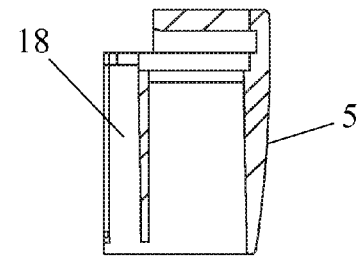
FIGS. 7D and 7E are cross-sectional views of the lower portion shown in FIG. 7C taken along the line A-A and B-B, respectively.
Figure 7E:
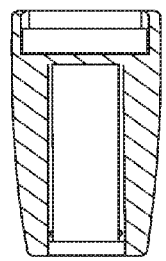
Figure 8A:
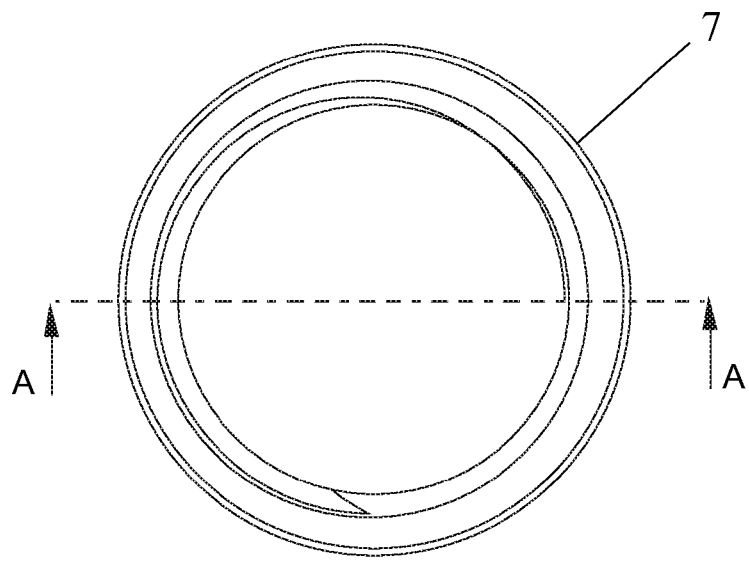
FIG. 8A is a top view of the upper portion of the hose nut shown in FIG. 4.
Figure 8B:
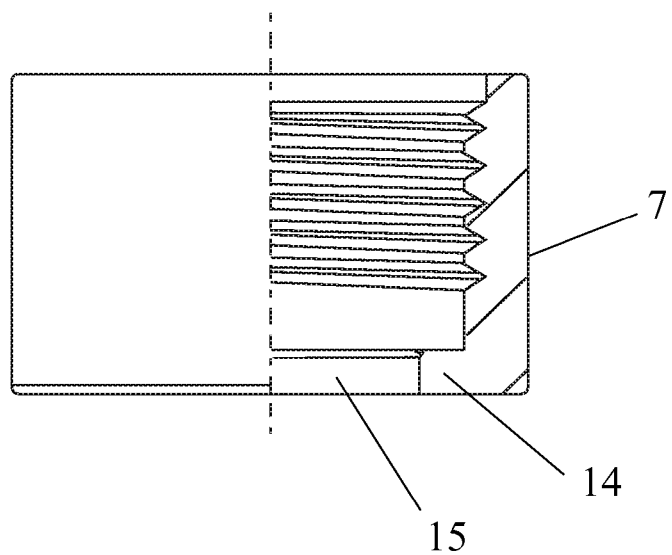
FIG. 8B is a partial cross-sectional view of the upper portion shown in FIG. 8A taken along the line A-A.
Figure 9A:
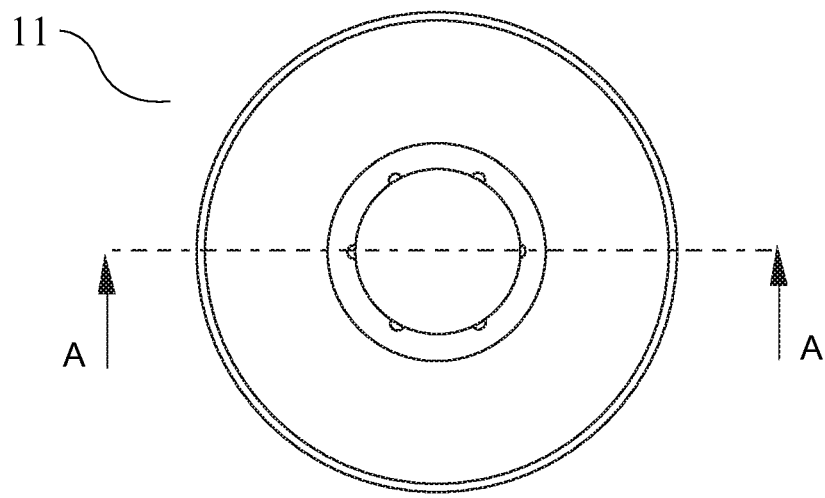
FIG. 9A is a top view of the mandrel assembly of the hose nut shown in FIG. 4.
Figure 9B:
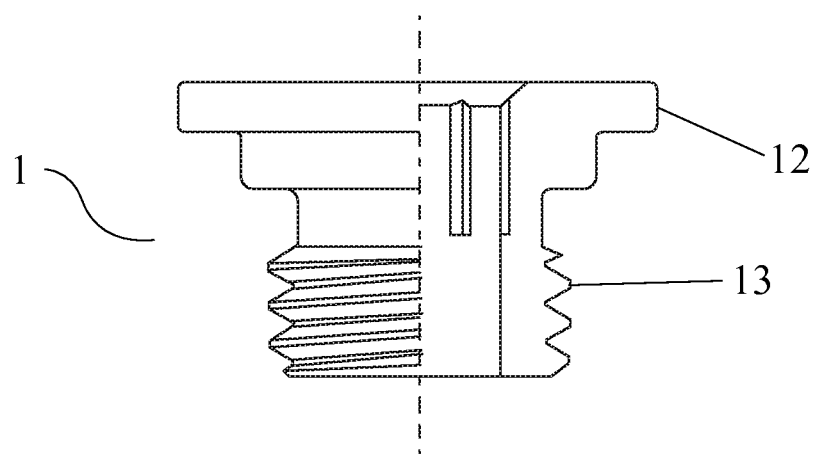
FIG. 9B is a partial cross-sectional view of the mandrel assembly shown in FIG. 9A taken along the line A-A.

In order to mount the magnetic element 8 onto the lower portion 5, an undercut portion 18 is formed on the side of the lower portion 5 of the nut body 3 (see FIG. 7D), and the magnetic element 8 is recessed and embedded in the undercut portion. In addition, a holder 19, preferably made of high density plastic materials such as PBT (polybutylene terephthalate) and POM (polyoxymethylene), is provided to define together with a surface of the undercut portion 18 a space in which the magnetic element 8 is enclosed. In this embodiment, the magnetic element holder 19 is in the shape of a frame comprising a flat surface and two side plates extending from the opposite ends of the flat surface, respectively. The flame and the surface of the undercut portion 18 together define a rectangular space for embedding the magnetic element 8 therein. When the two plates of the frame are mounted onto the lower portion 5 of the nut body 3, the flat surface of the holder 19 is flush with an outer surface of the lower portion 5.

The hose nut 1 and the water hose 2 thus form a water hose assembly 25 for connecting a faucet and a shower head, which can be easily and slidably attached to a holding device mounted on the wall. In some cases, the water hose assembly can be provided as an integral product, that is, with the water hose being integrally formed or prefabricated with the hose nut.

A hose nut 1 according to a second embodiment of the present invention is illustrated in FIGS. 4-10C. The second embodiment of the present invention differs from the first embodiment in two aspects, which will be explained in detail as follows.

Figure 10A:
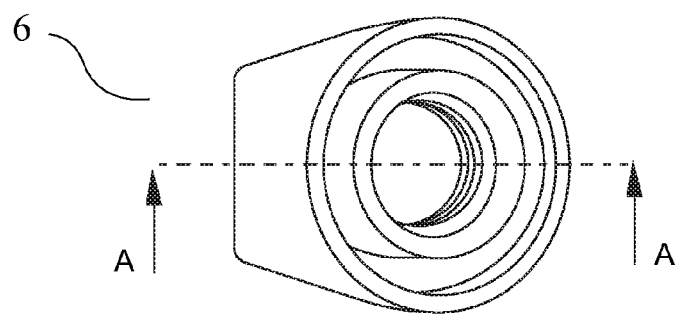
FIGS. 10A and 10B are top and bottom views, respectively, of the transition portion of the hose nut shown in FIG. 4.
Figure 10B:
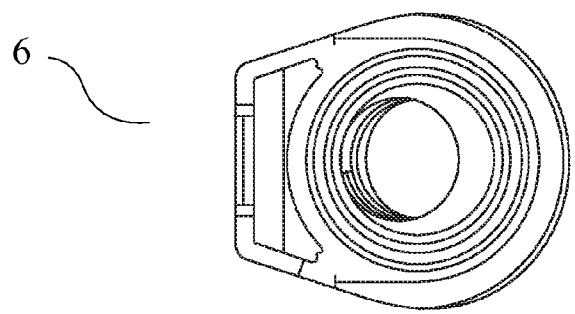
Figure 10C:
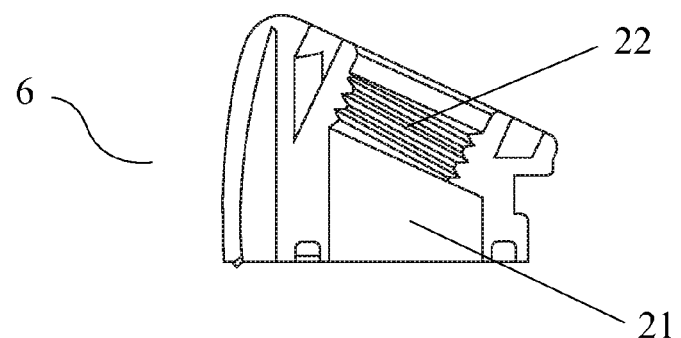
FIG. 10C is a cross-sectional view of the transition portion shown in FIG. 10A taken along the line A-A.
Figure 11A:
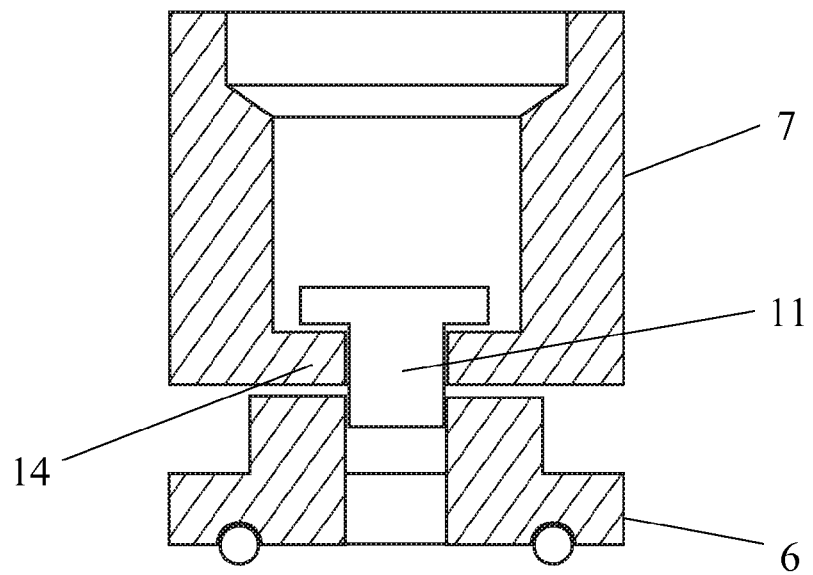
FIG. 11A is a cross-sectional view of the upper portion, the mandrel assembly and the transition portion of the hose nut shown in FIG. 1.
Figure 11B:
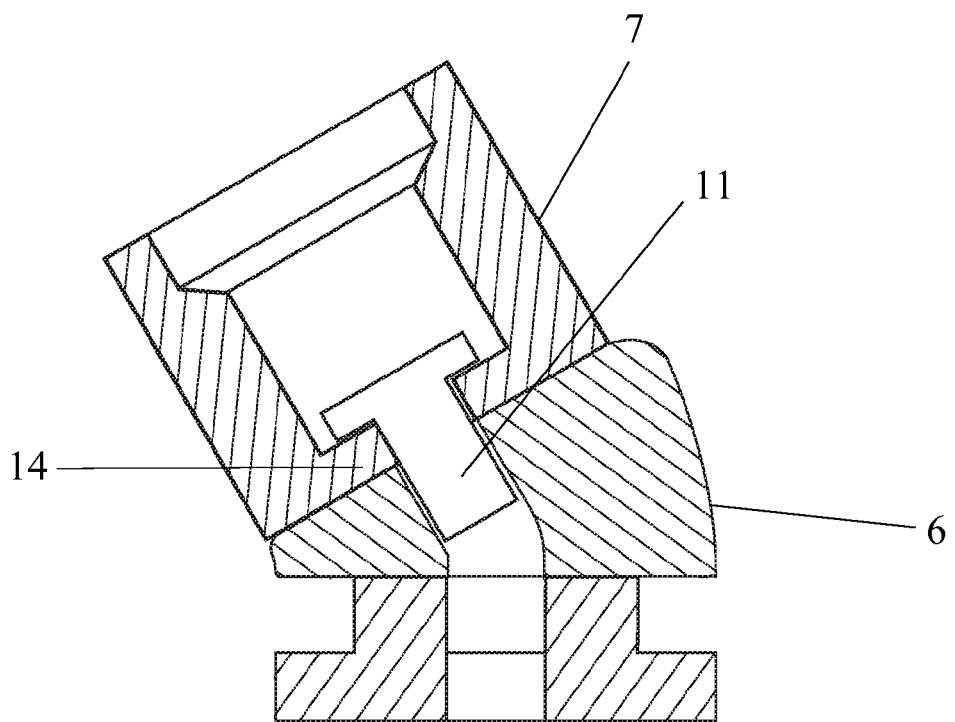
FIG. 11B is a cross-sectional view of the upper portion, the mandrel assembly and the transition portion of the hose nut shown in FIG. 4.

The first difference between the second and the first embodiments is that, in the first embodiment, the lower portion 5, the transition portion 6 and the upper portion 7 of the nut body 3 are aligned (as best seen in FIG. 3), while in the second embodiment, the transition portion 6 is secured at an angle to the lower portion 5 but is aligned with the upper portion 7. As shown in FIG. 10C, the throughbore of the transition portion 6 of the second embodiment is formed to comprise a lower segment 21 and an upper segment 22 at an angle with each other. The lower segment 21 is aligned with the throughbore of the lower portion 5, while the upper segment 22 is aligned with the throughbore of the upper portion 7.

Figure 6:
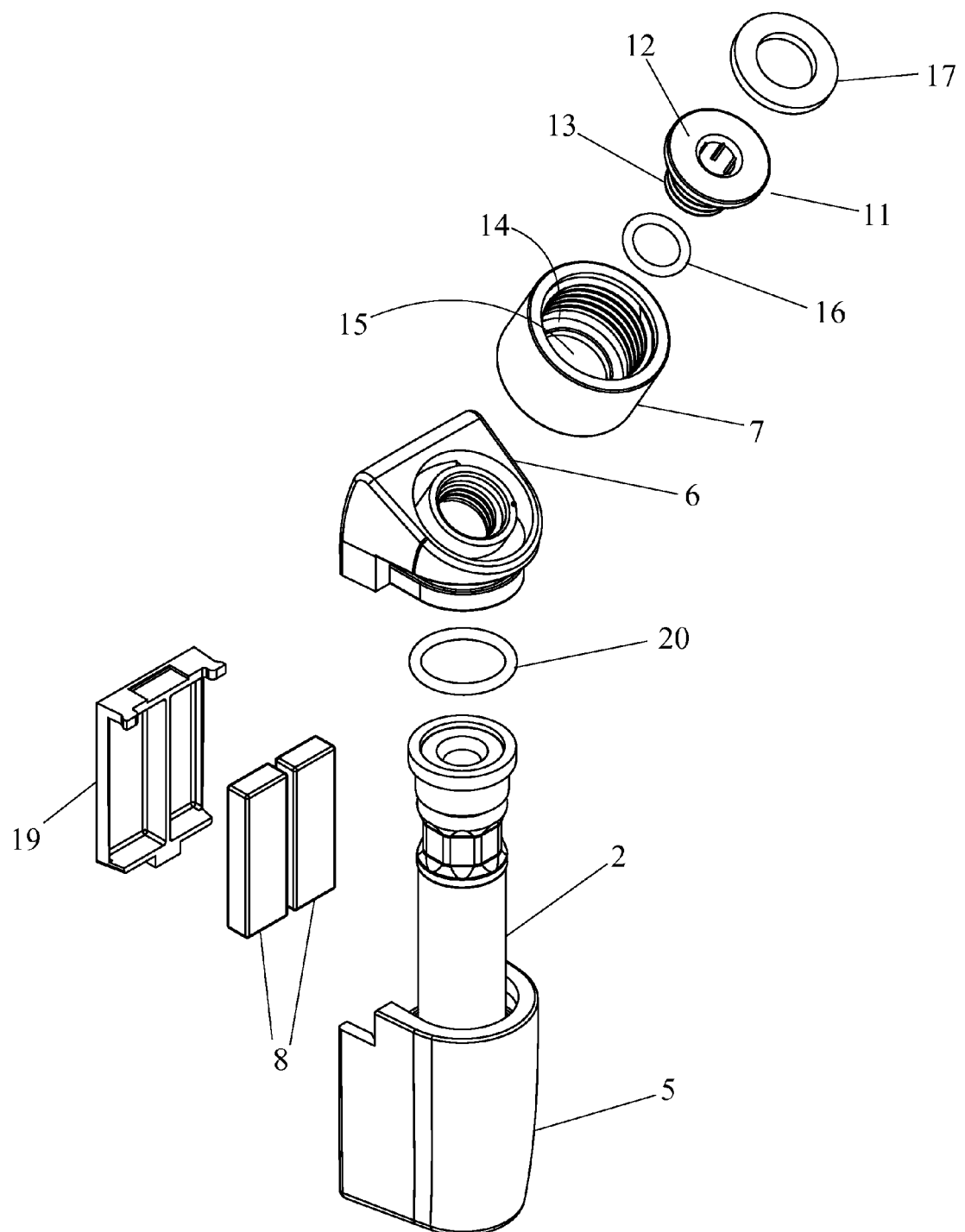
FIG. 6 is an exploded perspective view of the hose nut shown in FIG. 4.

The second aspect in which the second embodiment differs from the first embodiment is that, in the second embodiment, two magnetic elements 8 are provided and are mounted in parallel on the side of the lower portion 5 of the nut body 3, as shown in FIG. 6. Correspondingly, the holder 19 is formed to comprise two compartments for accommodating the two magnetic elements respectively. Those skilled in the art will understand that the more magnetic elements are provided, the stronger the magnetic attraction force between the magnetic elements and the holding device will be. Therefore, the number of magnetic elements can be adjusted according to practical conditions, such as the total weight of the hose nut, without departing from the scope of the present invention.

Figure 12:
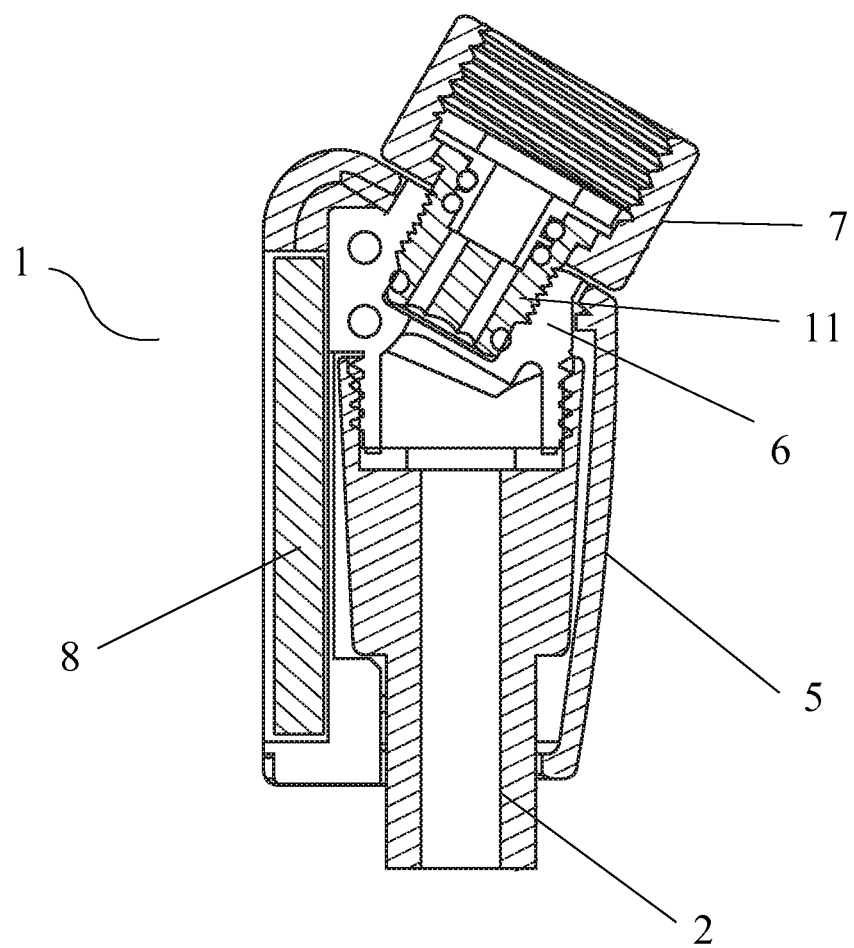
FIG. 12 is a cross-sectional view of a hose nut according to an embodiment of the present invention.
Figure 13:
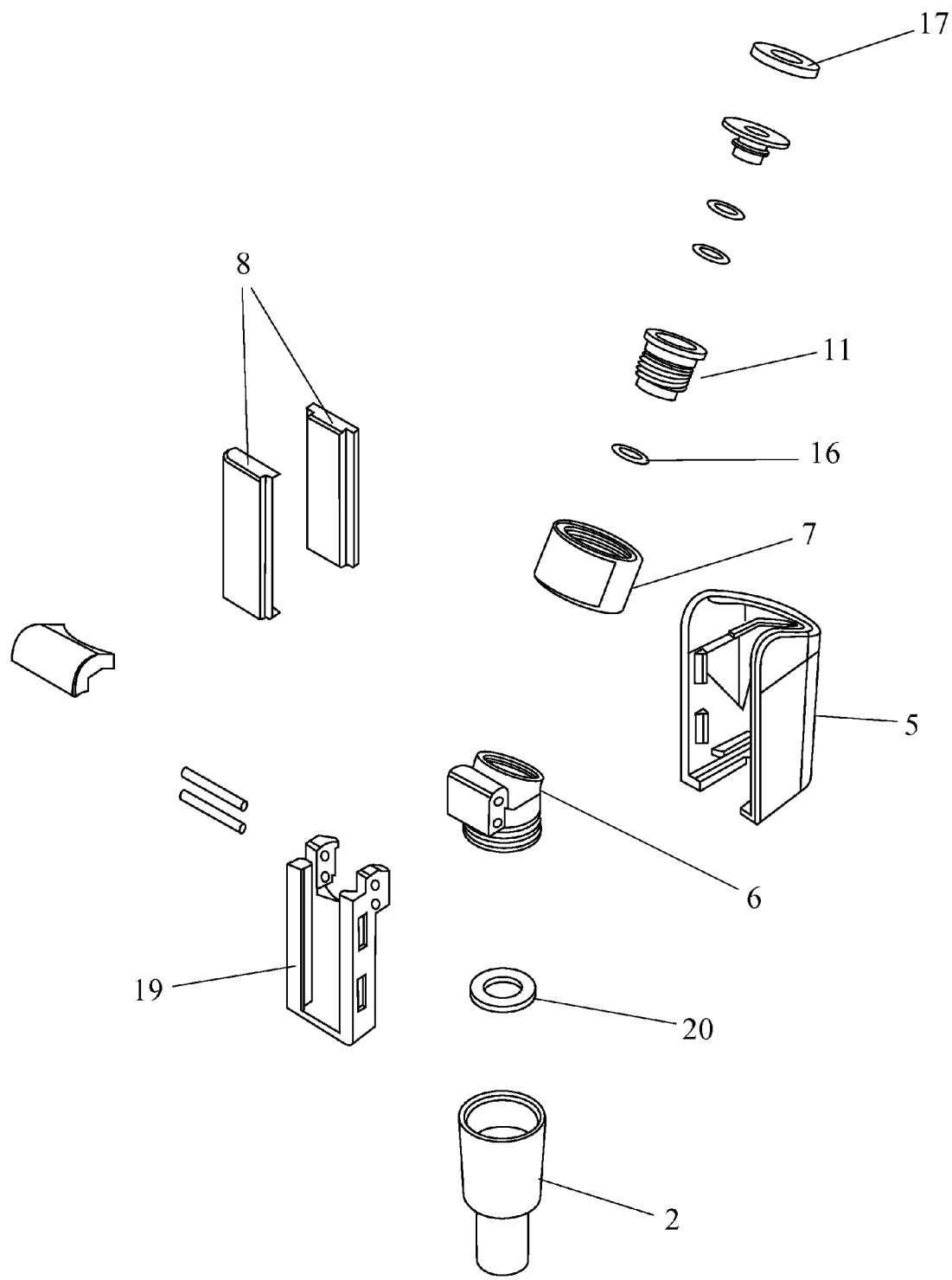
FIG. 13 is an exploded perspective view of the hose nut shown in FIG. 12.

FIGS. 12 and 13 illustrate a hose nut according to a third embodiment of the present invention, which differs from the second embodiment only in that the transition portion 6 is accommodated within the lower portion 5, instead of being placed on top of the lower portion 5. Such a configuration provides a more compact structure and appearance for the hose nut.

FIGS. 14A-17 illustrate a hose nut according to a fourth embodiment of the present invention, which differs from the third embodiment in that a cover portion 23 extends upwardly from a top of the lower portion 5 to form a one-piece housing 30 of the hose nut, in which housing the upper portion 7, the transition portion 6, the lower portion 5 and other components of the hose nut are all received, resulting in an even more compact structure and aesthetically desirable appearance for the hose nut. In addition, a locking mechanism is provided to lock the upper portion with the shower head at a desirable angle and prevent the rotation of the upper portion relative to the transition portion around the axis of the upper portion.

Figure 15:
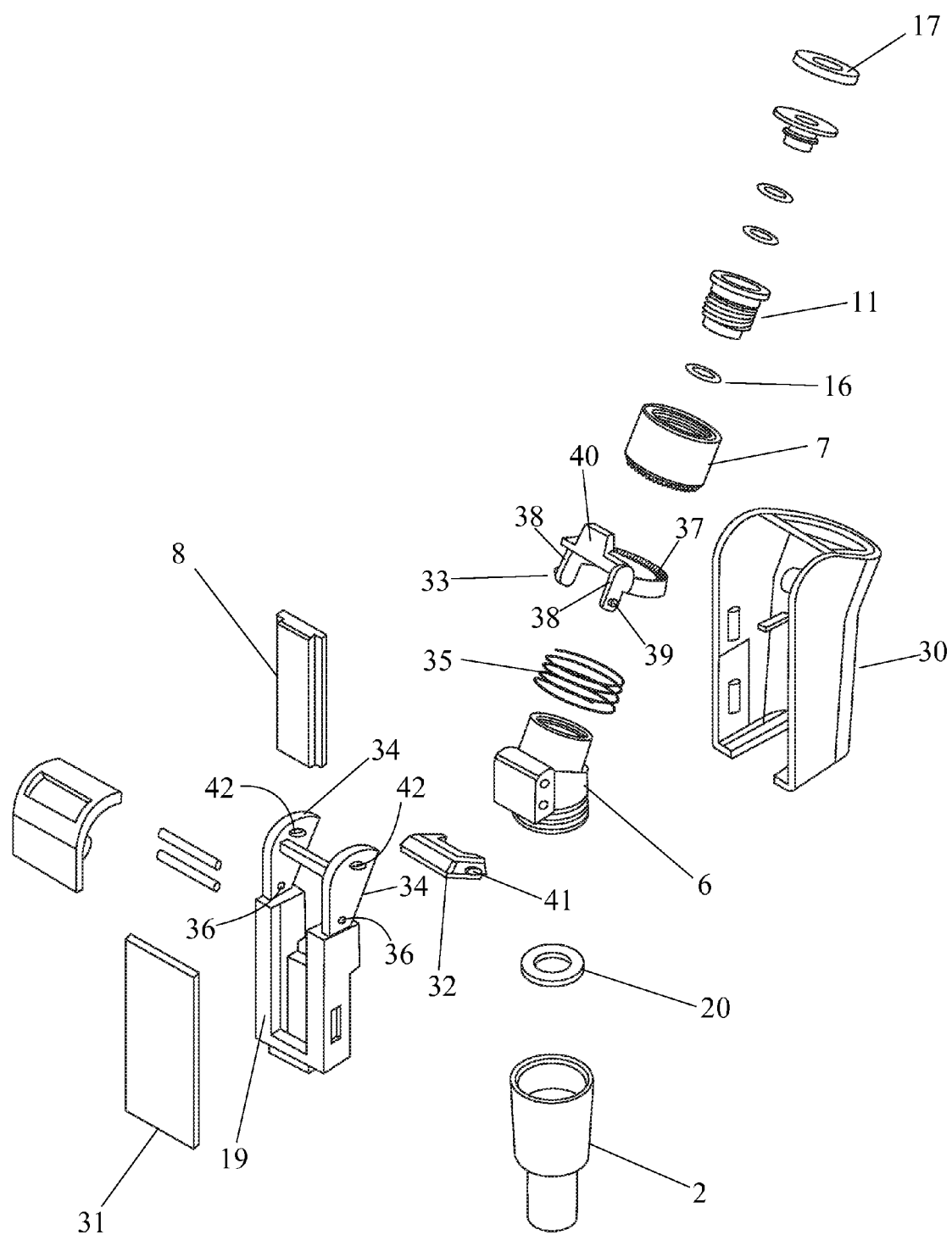
FIG. 15 is an exploded perspective view of the hose nut shown in FIGS. 14A and 14B.
Figure 16A:
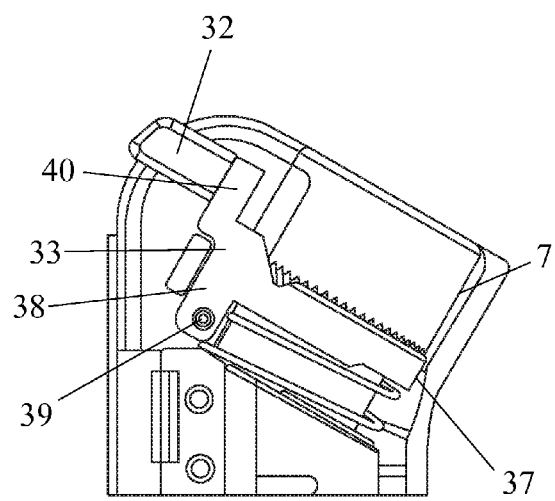
FIG. 16A is a side view of the hose nut shown in FIGS. 14A and 14B with the integral housing removed when the button is not pressed.
Figure 16B:
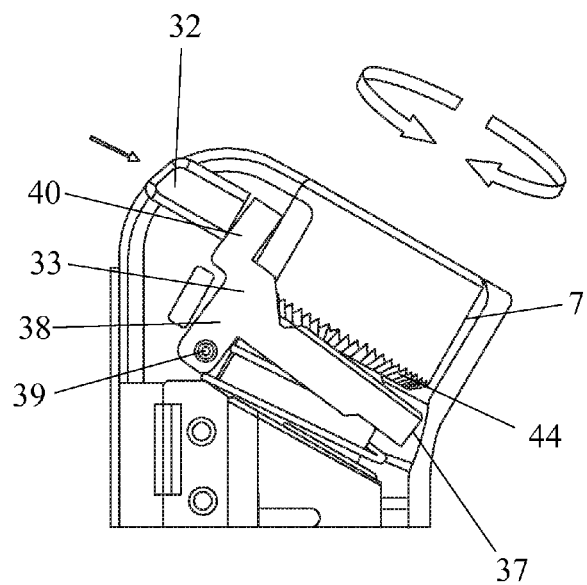
FIG. 16B is a side view of the hose nut shown in FIGS. 14A and 14B with the integral housing removed when the button is pressed.
Figure 16C:
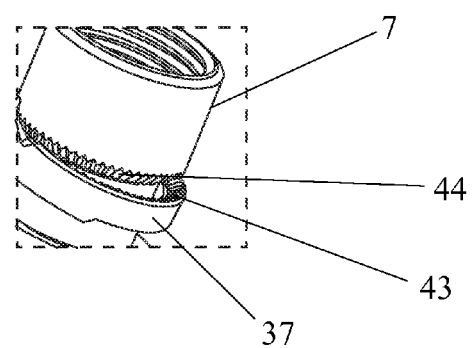
FIG. 16C is partial perspective view of the hose nut shown in FIGS. 14A and 14B showing the tooth on the stopper and the recesses on the upper portion.
Figure 17:
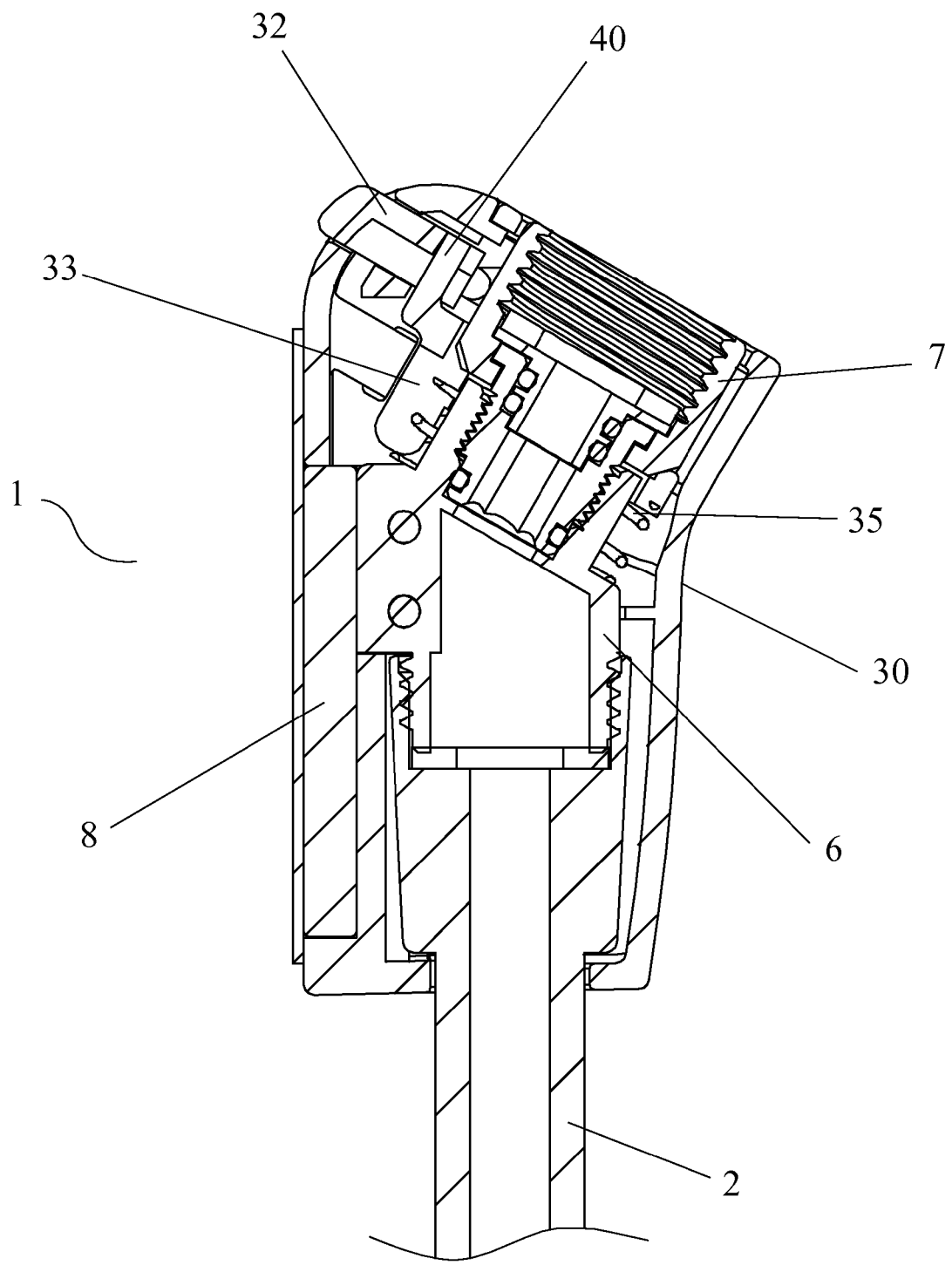
FIG. 17 is a cross-sectional view of the hose nut shown in FIGS. 14A and 14B.

As shown in FIGS. 15-17, the locking mechanism comprises a button 32, a stopper 33 coupled to the button 32, a pair of posts 34 and a spring 35. The stopper is configured to engage with the upper portion thereby creating a lock therebetween for prevention of the rotation of the upper portion when the button is released, and to disengage from the upper portion to allow the rotation of the upper portion when the button is pressed.

In particular, the pair of posts 34 are integrally formed with the holder 19 and extend upwardly from a top of the holder 19 on opposite sides thereof. A hole 36 is drilled on each of the posts 34. The stopper 33 comprises an arc-shaped portion 37, a leg 38 extending downwardly from each of the two ends of the arc-shaped portion 37, and a pin 39 formed on an outer surface of each of the two legs 38. The two pins 39 are inserted into the two holes 36, respectively, such that the stopper 33 is pivotally mounted between the pair of posts 34. The stopper 33 further comprises a baffle plate 40 connecting the two ends of the arc-shaped portion 37, which baffle plate abuts against the button 32. The button 32 is movably mounted between the pair of posts 34 via a pair of protrusions 41 formed on opposite sides of the button 32 and received in a pair of slits 42 formed on the pair of posts 34, respectively. The slits 42 are sized to allow for free movement of the protrusions 41 therein along the length of the slits 42, when the button 32 is pressed or released. The length of the slits 42 is long enough to allow the button 32 to push the stopper 33 to completely disengage from the upper portion 7.

A plurality of teeth 43 are formed on an inner surface of the arc-shaped portion 37 of the stopper 33, which teeth are provided to be able to engage with a plurality of respective recesses 44 formed on a circumference of a bottom of the upper portion 7 to prevent the rotation of the upper portion 7. Those skilled in the art will understand that, in order to prevent the rotation of the upper portion 7, merely one tooth needs to be formed on the inner surface of the arc-shaped portion 37. The plurality of teeth 43 are provided in this embodiment to demonstrate the optimal effect of locking the upper portion 7. The spring 35 is arranged and compressed under the arc-shaped portion 37 of the stopper 33 to constantly apply an upward force to the stopper 33.

As best seen in FIGS. 16B and 16C, when the button 32 is pressed to move inwardly, it pushes against the baffle plate 40 of the stopper 33, forcing the stopper 33 to pivot downwardly to cause the teeth 43 on the inner surface of the arc-shaped portion 37 of the stopper 33 to disengage from the recesses 44 on the bottom of the upper portion 7, which allows for rotation of the upper portion 7 relative to the transition portion 6. When the button 32 is released, as shown in FIG. 16A, the stopper 33 is forced by the spring 35 to pivot upwardly to cause the teeth 43 to engage with the recesses 44, thereby locking the upper portion 7 and preventing the upper portion 7 to rotate relative to the transition portion 6. Preferably, a depressed portion is formed on a front side of the button 32 to receive the baffle plate 40 of the stopper 33, thereby preventing the stopper 33 from swaying to the left or to the right, and providing a higher stability of the locking mechanism.

As a result of the locking mechanism discussed above, when the button 32 is pressed, the upper portion is allowed to rotate relative to the transition portion around the axis of the upper portion. When the button 32 is released, the rotation of the upper portion is prevented, thereby locking the shower head at a certain angle desired by the user. For example, the locking mechanism allows the user to adjust the position of shower head such that the shower head is facing right in front of the user when the shower head is hanged on the magnetic or metallic bar by the magnetic element of the hose nut.

Preferably, when the button 32 is released, part of the button extends beyond the one-piece housing 30 through a window formed on the one-piece housing 30, and when the button 32 is fully pressed, an outer surface of it becomes flush with an outer surface of the one-piece housing 30. Such a locking mechanism allows the shower head to be conveniently rotated and to be fixed at a certain desired angle.

Figure 14A:
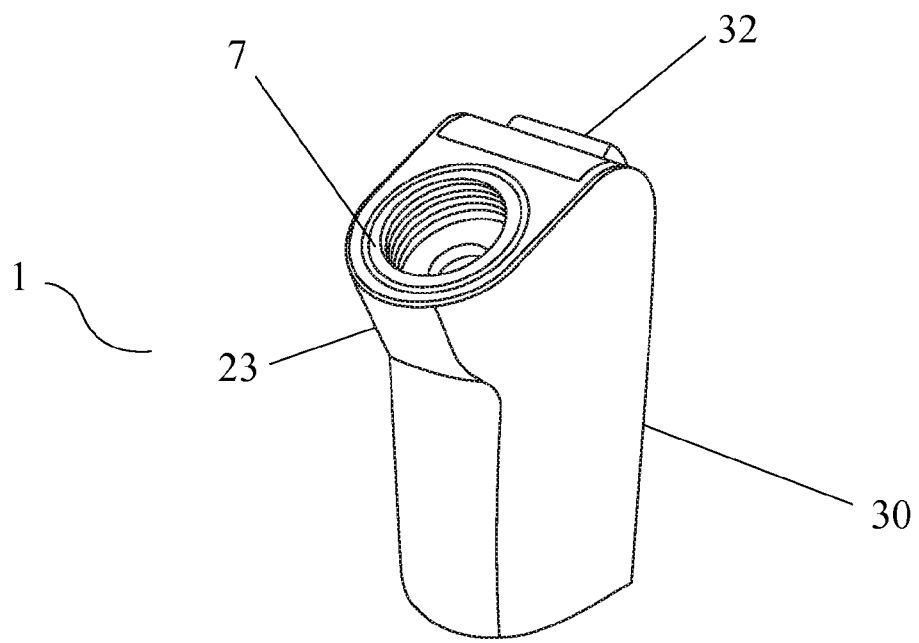
FIGS. 14A and 14B are perspective views of a hose nut according to another embodiment of the present invention.
Figure 14B:
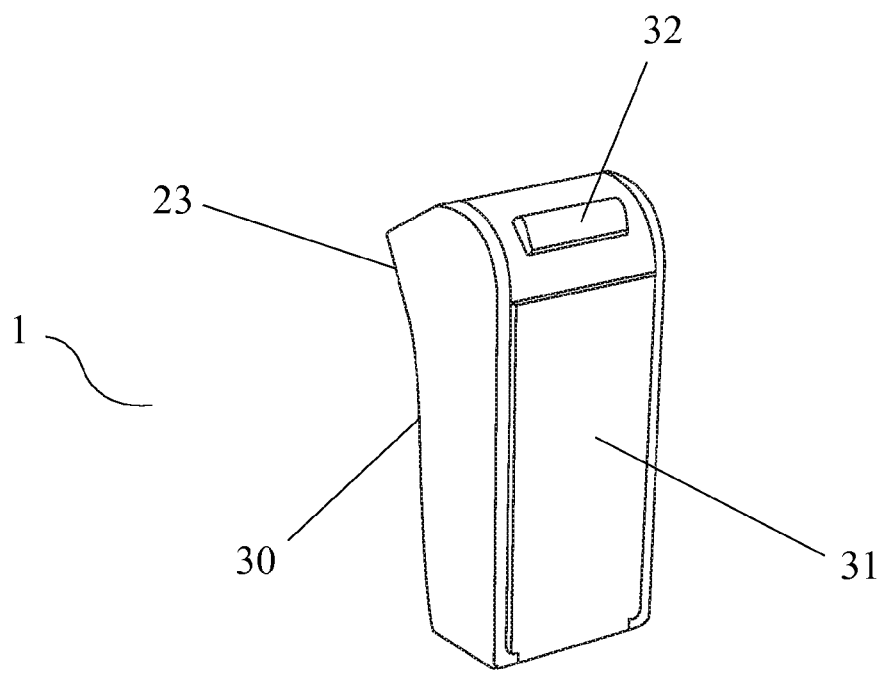

Furthermore, as shown in FIG. 14B, a buffering pad 31, preferably made of rubber materials, is mounted on an outer side surface of the holder, which surface is to be attached to the holding device on the wall for hanging the shower head. In order words, the buffering pad 31 is provided between the hose nut and the wall, to provide a "soft touch" feeling when mounting the hose nut onto the wall. In addition, the buffering pad 31 is able to increase the friction between the mounted hose nut and the wall, thus reinforcing the attachment of the hose nut to the wall.

Figure 18:
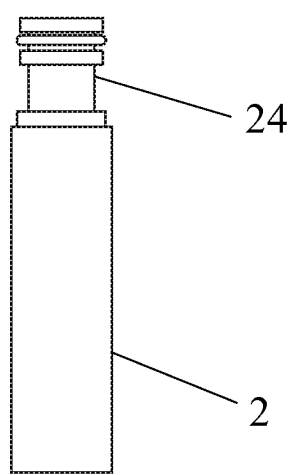
FIG. 18 is a perspective view of the adaptor of a hose nut and a water hose according to an embodiment of the present invention.

In a fifth embodiment of the present invention as shown in FIG. 18, in order to allow the hose nut to be connected to water hoses of different sizes, a hose adaptor 24 is provided and connected to the lower portion 5 of the nut body 3. The hose adaptor 24 allows for connection with water hoses of different sizes. The structures of the rest of the hose nut are identical to any one of the above embodiments.

Figure 19:
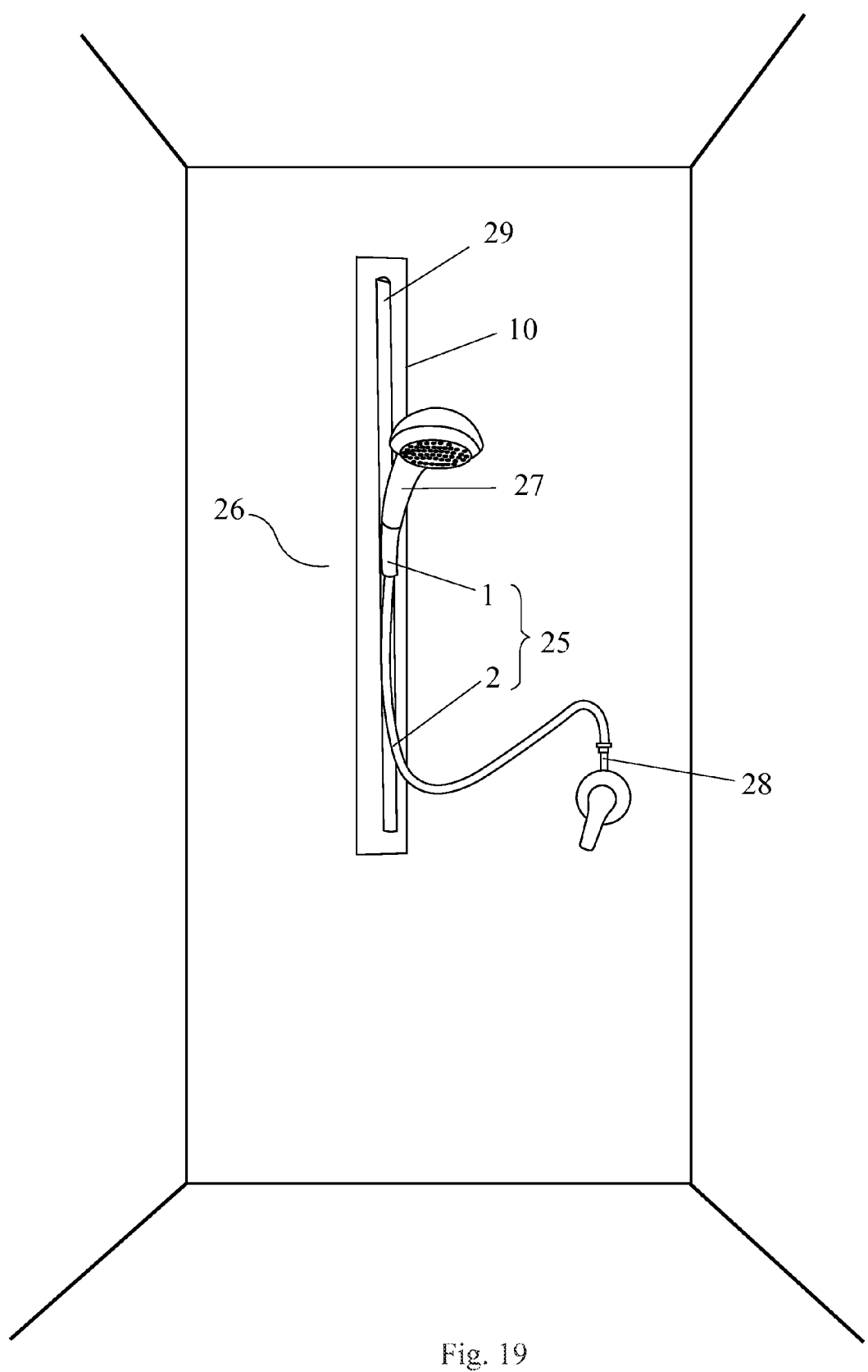
FIG. 19 is a perspective view of a shower system according to an embodiment of the present invention.

FIG. 19 illustrates a shower system 26 according to a sixth embodiment of the present invention, which comprises a water hose assembly 25 according to any one of the above embodiments, a shower head 27 connected to the water hose assembly 25 and a holding device 10 mounted on the wall. The water hose assembly 25 comprises a hose nut 1 connected to the shower head 27 and a water hose connected to a faucet 28. The holding device 10 is provided as a metallic or magnetic bar or panel having a longitudinal slot 29 formed thereon. The at least one magnetic element 8 of the hose nut 1 is inserted into the slot 29, and is guided to slide therein as a result of the smooth surface of the slot 29. Therefore, the hose nut 1 is mounted on the holding device 10 and is slidable thereon such that its height can be easily adjusted. As magnetic attraction forces are utilized to mount the hose nut of the present invention onto the wall, the structure of the hose nut is significantly simplified compared to existing products. As a result, the weight of the hose nut is substantially reduced, such that the holding device can be mounted onto the wall simply with an adhesive, without the need for fasteners that will cause damage to the wall, such as screws or nails.

While the present invention is described in connection with what is presently considered to be the most practical and preferred embodiment, it should be appreciated that the invention is not limited to the disclosed embodiment, and is intended to cover various modifications and equivalent arrangements included within the spirit and scope of the claims. Modifications and variations in the present invention may be made without departing from the novel aspects of the invention as defined in the claims, and this application is limited only by the scope of the claims.

NUMERICAL REFERENCES 1 hose nut
2 water hose
3 nut body
4 throughbore
5 lower portion
6 transition portion
7 upper portion
8 magnetic element
9 axis of the upper portion
10 holding device
11 mandrel assembly
12 top flange
13 mandrel
14 shoulder
15 opening
16 first O-ring seal
17 second O-ring seal
18 undercut portion
19 holder
20 third O-ring seal
21 lower segment of the throughbore of the transition portion
22 upper segment of the throughbore of the transition portion
23 cover portion
24 hose adaptor
25 water hose assembly
26 shower system
27 shower head
28 faucet
29 slot
30 one-piece housing
31 buffering pad
32 button
33 stopper
34 post
35 spring
36 hole
37 arc-shaped portion
38 leg
39 pin
40 baffle plate
41 protrusion
42 slit
43 tooth
44 recess

What is claimed is:

1. A hose nut for connecting a shower head to a water hose, comprising a nut body having a throughbore formed therein, the nut body comprising:
    a lower portion for receiving at least a part of the water hose;
    a transition portion immovably secured to the lower portion; an upper portion for connection to the shower head and arranged on the transition portion in such a manner that the upper portion is rotatable relative to the transition portion around an axis of the upper portion;
    at least one magnetic element mounted on a side of the lower portion, the magnetic element being configured such that it is slidably attachable to a holding device on a wall for hanging the shower head on the wall by a magnetic attraction force generated between the magnetic element and the holding device,
    wherein the hose nut further comprises a locking mechanism for locking the upper portion with the shower head at an angle and preventing rotation of the upper portion relative to the transition portion around the axis of the upper portion, and
    the locking mechanism comprising a button, and a stopper coupled to the button, the stopper being configured to engage with the upper portion thereby creating a lock therebetween for prevention of the rotation of the upper portion when the button is released, and to disengage from the upper portion to allow the rotation of the upper portion when the button is pressed.

2. The hose nut of claim 1, further comprising a mandrel assembly comprising a top flange having a central throughbore, and a mandrel extending downwardly from the top flange and having a central axially aligned through bore with the throughbore of the top flange to define a flow bore for water to pass through the mandrel assembly, wherein the mandrel assembly is disposed within the throughbore of the nut body, with the flow bore of the mandrel assembly in communication with the throughbore of the nut body.

3. The hose nut of claim 2, wherein the upper portion of the nut body comprises a shoulder extending inwardly from an inner surface of the throughbore of the upper portion, the shoulder defining an opening that is configured for allowing passage of the mandrel to be fixed to the transition portion of the nut body but preventing the top flange from passing therethrough, such that the upper portion is rotatable about the mandrel assembly relative to the transition portion.

4. The hose nut of claim 3, wherein the transition portion has internal threads formed on the inner surface of the throughbore thereof for mating engagement with corresponding threads formed on an outside of the mandrel of the mandrel assembly.

5. The hose nut of claim 3, wherein a first O-ring seal is placed between a bottom surface of the top flange of the mandrel assembly and the shoulder of the upper portion of the nut body.

6. The hose nut of claim 3, further comprising a second O-ring seal which is adapted to be placed between a top surface of the top flange of the mandrel assembly and the shower head.

7. The hose nut of claim 1, wherein the at least one magnetic element is recessed in an undercut portion formed on the side of the lower portion of the nut body and held by a holder which is configured to define together with a surface of the undercut portion a space in which the at least one magnetic element is enclosed.

8. The hose nut of claim 7, wherein the magnetic element holder is made of a high density plastic material to maintain the magnetic attraction force between the magnetic element and the holding device.

9. The hose nut of claim 7, wherein the holder for holding the at least one magnetic element is provided to be flush with an outer surface of the lower portion of the nut body.

10. The hose nut of claim 7, further comprising a buffering pad mounted on an outer side surface of the holder, which surface is to be attached to the holding device on the wall for hanging the shower head; and the buffering pad is capable of increasing a friction between the outer side surface of the holder and the holding device to reinforce the attachment therebetween.

11. The hose nut of claim 1, wherein the transition portion is accommodated within the lower portion.

12. The hose nut of claim 1, wherein a cover portion extends upwardly from a top of the lower portion to form a one-piece housing of the hose nut, and the upper portion is accommodated within the cover portion.

13. The hose nut of claim 1, wherein the lower portion, the transition portion and the upper portion of the nut body are provided such that the transition portion is secured at an angle to the lower portion but is aligned with the upper portion.

14. The hose nut of claim 1, wherein the upper portion has internal threads formed on an inner surface of the throughbore thereof for mating engagement with corresponding threads formed on an outside of the shower head, or the upper portion is configured to snap fit with the shower head.

15. The hose nut of claim 1, further comprising a hose adapter connected to the lower portion of the nut body, enabling connection of the hose nut to different water hoses.

16. The hose nut of claim 1, further comprising a third O-ring seal which is adapted to be provided between the hose nut and the water hose.

17. The hose nut of claim 1, wherein the stopper has at least one tooth on an inner wall surface thereof, wherein the at least one tooth is able to engage with one of a plurality of recesses circumferentially formed on an outer surface of a bottom of the upper portion when the button is released, and the at least one tooth of the stopper is forced to disengage from the recess on the bottom of the upper portion when the button is pressed.

18. The hose nut of claim 17, wherein a pair of posts extend upwardly from a top of the holder and the stopper is pivotally mounted between the pair of posts in such a manner that, when the button is pressed, the stopper is pushed by the button to pivot downwardly causing the at least one tooth of the stopper to disengage from the recess on the bottom of the upper portion.

19. The hose nut of claim 18, wherein the stopper comprises an arc-shaped portion arranged under the upper portion, and the at least one tooth is formed on an inner surface of the arc-shaped portion.

20. The hose nut of claim 19, wherein the locking mechanism further comprises a spring compressed under the stopper to constantly apply an upward force to the stopper, such that when the button is released, the stopper is forced by the spring to pivot upwardly, causing the at least one tooth of the stopper to engage with the recess on the bottom of the upper portion.

21. A water hose assembly for connecting a faucet and a shower head, comprising a water hose, and a hose nut according to claim 1, wherein the hose nut and the water hose are prefabricated as one piece.

22. A shower system comprising:
a water hose assembly for connecting a faucet and a shower head, the water hose assembly comprising a water hose, and a hose nut according to claim 1, wherein the hose nut and the water hose a prefabricated as one piece, and
a shower head.

23. The shower system of claim 22, further comprising the holding device which is provided as a metallic or magnetic bar, or as a metallic or magnetic panel, such that the hose nut is able to be slidably attached to the bar or the panel at different heights of the wall or on different positions of the wall.

24. The shower system of claim 23, wherein the bar or the panel is mounted on the wall with an adhesive.

25. The shower system of claim 23, wherein the bar has a longitudinal slot into which the at least one magnetic element of the hose nut is inserted, thereby the hose nut is guided to slide in the slot.

26. The hose nut of claim 1, wherein the buffering pad is a rubber pad.

* * * * *